United States Patent
Barre

[19]

[11] Patent Number: 6,124,008
[45] Date of Patent: Sep. 26, 2000

[54] INJECTED-MOLDED PACKAGE OF BLENDED ETHYLENE/OLEFIN COPOLYMERS

[75] Inventor: Patrice Barre, Antony, France

[73] Assignee: L'Oreal, Paris, France

[21] Appl. No.: 09/018,556

[22] Filed: Feb. 4, 1998

[30] Foreign Application Priority Data

Feb. 4, 1997 [FR] France .................................. 97-01228

[51] Int. Cl.[7] .......................... B65D 35/08; C08F 210/16
[52] U.S. Cl. ..................... 428/35.7; 222/107; 428/36.92; 525/240
[58] Field of Search ................................. 428/34.1, 35.7, 428/36.92; 525/240; 222/107

[56] References Cited

U.S. PATENT DOCUMENTS

| | | | |
|---|---|---|---|
| 5,015,511 | 5/1991 | Treybig et al. | 428/34.1 |
| 5,041,501 | 8/1991 | Shirodkar | 525/240 |
| 5,407,742 | 4/1995 | Tavss et al. | 428/34.2 |
| 5,582,328 | 12/1996 | Brown | 222/23 |
| 5,677,383 | 10/1997 | Chum et al. | 525/240 |
| 5,763,534 | 6/1998 | Srinivasan et al. | 525/240 |
| 5,888,660 | 3/1999 | Landoni et al. | 428/516 |

FOREIGN PATENT DOCUMENTS

| | | |
|---|---|---|
| 0 103 942 | 3/1984 | European Pat. Off. . |
| 0 315 238 | 5/1989 | European Pat. Off. . |
| 0 342 032 | 11/1989 | European Pat. Off. . |
| WO 96/18662 | 6/1996 | WIPO . |

*Primary Examiner*—Nasser Ahmad
*Assistant Examiner*—Sandra M. Nolan
*Attorney, Agent, or Firm*—Oblon, Spivak, McClelland, Maier & Neustadt, P.C.

[57] ABSTRACT

A package having improved resistance to stress-cracking due to chemical attack is provided having a wall made of a polymer blend containing:

a) a first ethylene/$C_4$ to $C_5$ olefin copolymer and
b) a second ethylene/$C_6$ to $C_{10}$ olefin copolymer, wherein the package is obtained by injection-molding the blend in a suitable mold, preferably give a flexible tube, and a particular thermoplastic blend for producing the package.

12 Claims, 1 Drawing Sheet

INJECTED-MOLDED PACKAGE OF BLENDED ETHYLENE/OLEFIN COPOLYMERS

BACKGROUND OF THE INVENTION

1. Field of the Invention

The present invention relates to a thermoplastic blend and to a compressible package of the tube type, obtained using this blend. The invention relates more particularly to the production, by injection moulding, of plastic tubes having an improved stress-cracking resistance. The package of the invention is intended, in particular, to contain a cosmetic, pharmaceutical, dermo-pharmaceutical product or certain food products, and is particularly suitable for containing a product which contains one or more surfactants.

2. Discussion of the Background

Stress cracking is a term used to describe a phenomenon of chemical attack of a product acting on a polymeric material. The phenomenon is almost imperceptible when this material is not subjected to a mechanical stress. However, contact of the material with the product causes microcracks to form. When the material is then put under stress—for example, in the case of a plastic bottle containing a shampoo, by manually compressing the closed bottle—the microcracks propagate, leading to embrittlement of the material and to fracture of the polymeric wall. In the example in question, the bottle will therefore inevitably leak. The stress-cracking phenomenon occurs in particular in strongly folded regions or in heat-sealing regions, for example at the bottom of a tube which has been obtained by pinching the free end of the compressible wall of the tube, followed by heat sealing.

Currently, most of the packages used are made of plastic, particularly in the cosmetic field, such as tubes or bottles intended to contain a cream or a shampoo. In order to manufacture them, thermoplastic polymers, and more particularly suitable polyolefins, are generally used, prepared by an extrusion or extrusion blow-moulding process with the aid of conventional industrial equipment.

Among the known thermoplastic polyolefins used are low-density polyethylenes, intended in particular for the manufacture of tubes. Low-density polyethylene tubes are flexible, thereby allowing easy expulsion of the product contained in the tube by simply compressing it. However, this type of polyethylene is incompatible with many chemicals and the phenomenon of stress cracking is regularly observed in the case of low-density polyethylene tubes, in particular when they contain a product comprising one or more surfactants. As a consequence, it is not conceivable to use such a tube for packaging a shampoo or a body-care emulsion, which generally contain at least one surfactant. This stress-cracking phenomenon is even more pronounced when the tubes are produced by injection moulding.

A thermoplastic blend that can be used for producing articles resistant to stress cracking is known, for example, from document EP-A-0,530,782, this blend being composed of:

a) a linear low-density ethylene copolymer containing a $C_4$ to $C_8$ olefin having approximately 10 to 15 long-chain branches per 1000 carbon atoms and b) a low-density polyethylene, with the copolymer being present in the blend in a proportion of between 25% and 35%. According to the illustrative embodiments, this blend is used for the manufacture of articles moulded by the techniques of extrusion or of blow moulding. The melt flow indices of the materials mentioned in this reference do not allow these materials to be used for producing tubes using the technique of injection moulding.

Furthermore, EP-A-0,103,942 describes bags manufactured from a plastic film, the film being made of a blend comprising at least one ethylene/$C_6$ to $C_{10}$ olefin copolymer having a density of between 0.916 and 0.930 g/cm³ and an ethylene/$C_4$ to $C_{10}$ olefin copolymer having a density of between 0.916 and 0.924 g/cm³. This blend cannot be used for the injection moulding of thin-walled articles since, at the temperatures of injection moulding, it has too low a flow index.

Likewise, blends of ethylene/octene copolymers and ethylene/butene copolymers described in document EP-A-0,315,028 cannot be used since they have too low a flow index at the injection-moulding temperatures.

SUMMARY OF THE INVENTION

Accordingly, one object of the present invention is to provide the production of a compressible tube of the aforementioned type, made of plastic, that does not undergo the stress-cracking phenomenon and that can be injected, when hot, into a suitable mould by injection moulding of a thermoplastic.

A further object of the present invention is to find a thermoplastic that is sufficiently fluid to allow production, by injection moulding, of packages such as compressible tubes or bottle-tubes, in particular thin-walled tubes.

These and other objects of the present invention have been satisfied by the discovery of a package having improved stress-cracking resistance, having a wall made of a thermoplastic blend comprising:

(a) a first ethylene/$C_4$ to $C_5$ olefin copolymer and (b) a second ethylene/$C_6$ to $C_{10}$ olefin copolymer, wherein the package is obtained by injection-moulding the blend in a suitable mould, and the thermoplastic blend of (a) and (b).

BRIEF DESCRIPTION OF THE FIGURES

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
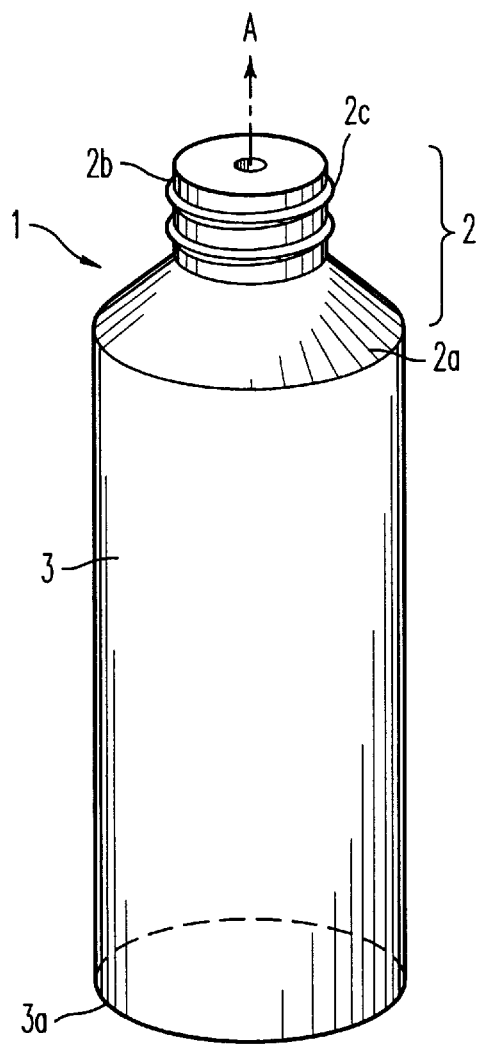
FIG. 1 represents a side view of a package according to the invention, before sealing the bottom.

After extensive research, the Applicant has discovered a blend of thermoplastics, the constituents of which are mutually compatible, wherein the blend is easy to inject into a mould for the production of tubes that have flexible walls and good stress-cracking resistance.

The present invention relates to a package having improved stress-cracking resistance, having a wall made of a thermoplastic blend comprising:

(a) a first ethylene/$C_4$ to $C_5$ olefin copolymer and (b) a second ethylene/$C_6$ to $C_{10}$ olefin copolymer, wherein the package is obtained by injection-moulding the blend in a suitable mould.

According to a preferred embodiment, the first copolymer is a linear low-density ethylene/butene copolymer (LLDPE).

Advantageously, the first polymer has a density of less than or equal to 0.910 g/cm³, preferably less than or equal to 0.900 g/cm³.

Preferably, a linear low-density ethylene/octene copolymer (LLDPE) is chosen as the second copolymer. Preferably, the second polymer has a density of between 0.915 g/cm³ and 0.930 g/cm³.

In the case of the first copolymer, a linear low-density ethylene copolymer containing ethylene groups and butene groups is preferred, for example the product sold by the company Enichem under the brand name CLEARFLEX MQFO®, the density of which is less than 0.910 g/cm³.

In the case of the second copolymer, a linear low-density ethylene copolymer containing octene units is preferably used, such as the product DOWLEX 2035E® sold by the company Dow Chemical or the product STAMYLEX 08076F® sold by the company DSM.

In accordance with one preferred embodiment of the present invention, the blend formed by the first and second copolymers has a melt flow index (ISO 1133 standard) of approximately 10 g/10 min. Because of this relatively high flow index, the blend is particularly suitable for injection-moulding thin-walled articles.

The first copolymer of the present invention preferably has a melt flow index (ISO 1133 standard) of from 10 g/10 min to 20 g/10 min (grades 10 to 20), more preferably from 12 g/10 min to 15 g/min, most preferably approximately 13 g/10 min.

The second copolymer of the present invention preferably has a melt flow index (ISO 1133 standard) of from 4 g/10 min to 8 g/10 min (grade 4 to grade 8), more preferably from 5 g/10 min to 7 g/10 min, most preferably approximately 6 g/10 min. The thermoplastic blend of the invention can be used, in particular, for the injection moulding of any thin-walled plastic article which has to be flexible.

Thus, according to a preferred embodiment of the invention, the package is in the form of a tube. Advantageously, this tube has a relatively rigid head, consisting of a shoulder and a neck which is provided with a dispensing hole, and a compressible peripheral wall connected to the shoulder. The peripheral wall is flexible and forms a compressible body of the tube, in which the product is packaged. A cap may be provided in order to seal the dispensing orifice during the storage period. According to one preferred aspect of the invention, the compressible wall is approximately cylindrical, or has an oval or polygonal cross-section. When the cross-section is circular, the external diameter of the tube is preferably from 10 mm to 50 mm, more preferably from 25 mm to 35 mm. Preferably, the wall has a thickness of from 0.2 mm to 1.0 mm, more preferably from 0.4 mm to 0.7 mm and most preferably approximately 0.5 mm.

Within the indicated flow index conditions of the blend, as well as of the noted wall thickness, it is easily possible to mould tubes of which the length of the compressible wall, measured along the axial dimension, is less than 15 cm. Preferably, in respect of the compressible wall, dimensions are chosen such that the wall length/wall diameter ratio of the tube is less than or equal to 4. According to the present invention, such a package is obtained by injecting the polymer blend, when hot, into a suitable mould.

After pinching and sealing of the free end of the compressible wall which is opposite the dispensing head, a volume is obtained which may range from approximately 5 ml to approximately 250 ml, preferably from 30 ml to 100 ml, and more preferably from 60 ml to 80 ml. This volume is intended to contain the product, such as a cosmetic or dermatological product. The volume can be varied depending on the cross-section of the tube and on its length.

The present invention also provides a thermoplastic blend that can be used for manufacturing, by injection moulding, articles that must resist stress cracking, such as tubes, comprising (a) a first ethylene/$C_4$ to $C_5$ olefin copolymer and
(b) a second ethylene/$C_6$ to $C_{10}$ olefin copolymer.

Preferably, the first copolymer is a linear low-density ethylene/butene copolymer (LLDPE) having a density of less than or equal to 0.910 g/cm³ and the second copolymer is a linear low-density ethylene/octene copolymer (LLDPE) having a density of from 0.915 g/cm³ to 0.930 g/cm³, with the proportion of the first copolymer in the blend being from 5% to 33% by weight and the proportion of the second copolymer being from 95% to 67% by weight, with respect to the total weight of the blend.

The present invention is described below with respect to an illustrative embodiment which is merely for improving understanding of the invention and is not intended to be limiting thereof.

Denoted by the reference 1 in FIG. 1 is a packaging assembly according to the present invention, in the form of an open tube, as obtained by injection moulding in a suitable mould. The tube 1, of axis A, has a cylindrical body formed by a cylindrical sidewall 3 provided with an open end 3a. On the opposite side from the end 3a, the body is surmounted by a dispensing head 2 having a frustoconical shoulder 2a which is extended by a cylindrical neck 2b having a smaller diameter than the diameter of the body 3. The neck 2b has an external thread 2c capable of engaging with a sealing cap (not shown). The head 2 is provided with a dispensing orifice 2d of smaller diameter than the diameter of the neck 2b.

Figure 2:
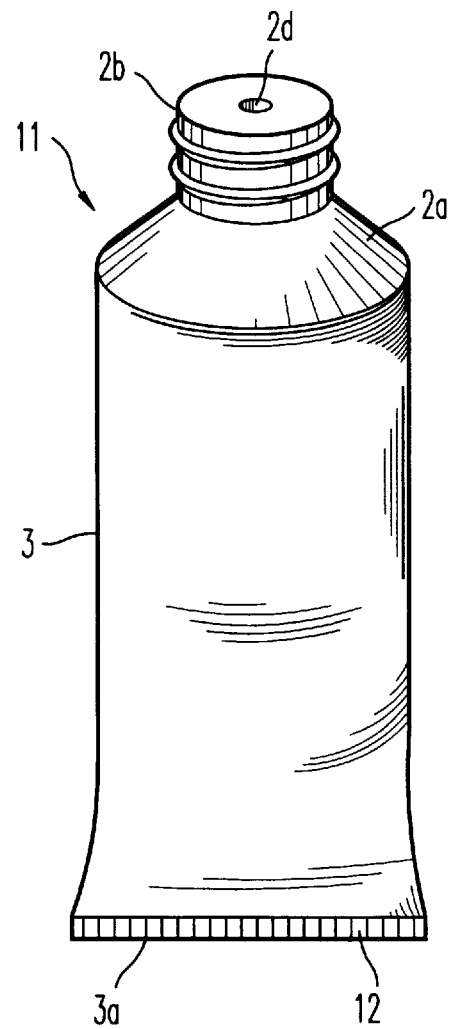
FIG. 2 represents a side view of the package of FIG. 1, after sealing the bottom.

In order to fill the tube 1, the neck 2 is closed off by a cap and the assembly is turned upside down so that the open end 3a is uppermost. A suitable amount of product is then poured into the tube. By means of a heated clamp, the free end 3a is pinched and, at the same time, a weld 12 is made, as shown in FIG. 2, in order to close off the bottom of the tube.

EXAMPLES

Having generally described this invention, a further understanding can be obtained by reference to certain specific examples which are provided herein for purposes of illustration only and are not intended to be limiting unless otherwise specified.

Open tubes 1, as shown in FIG. 1, were obtained by injecting a molten blend of two copolymers into a suitable mould. The injection-moulding temperature was approximately 200° C. This blend comprised:

33% of a linear low-density ethylene/butene copolymer, grade 13 (sold by the company Enichem under the brand name CLEARFLEX MQFO) and 66% of a linear low-density ethylene/octene copolymer, grade 6-7 (sold by the company Dow Chemicals under the brand name DOWLEX 2035E or the product STAMYLEX 08076F sold by the company DSM).

This tube included the head 2 and the sidewall 3. The height of the wall 3, along the axis A, was approximately 9 cm, with the thickness of the said wall 3 being approximately 0.5 mm.

After filling the tube with the product, the open end 3a of the tube was pinched and the end closed off by heat sealing. The tube 11 in its final form, as shown in FIG. 2, was then obtained. It may be seen that the end 3a, having a sealing strip 12, was now closed off. Because of the small thickness of the wall 3, the tube 11 can be easily deformed, by compressing it, by a user wishing to remove a dose of product.

MEASUREMENT OF THE STRESS-CRACKING RESISTANCE

Ten tubes 11, according to the present invention, as described above (see FIG. 2) were filled with a 0.3% aqueous solution of Antarox CO 630 (nonylphenol having 9 oxyethylene groups). The tube 11 was kept in an oven at 55° C. for a period of 24 hours. The sidewall 3 of the tube was then pressed manually, in a diametral manner, and it was noted whether there were leaks of liquid or not. In no case was a leak of product observed.

The cost of manufacture of a tube according to the present invention is substantially less than the cost of a tube manufactured by extrusion or extrusion blow moulding.

The present application is based on French Priority Application Serial No. 97-01228, filed in the French Patent Office on Feb. 4, 1997, the entire contents of which are hereby incorporated by reference.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A compressible tube having improved resistance to stress-cracking in the tube due to chemical attack, having a wall made of a thermoplastic polymer blend comprising:
   (a) a first ethylene/$C_4$ to $C_5$ olefin copolymer having a density of 0.910 gm/cm$^3$ or less and
   (b) a second ethylene/$C_6$ to $C_{10}$ olefin copolymer having a density of 0.915 to 0.930 gm/cm$^3$,
   wherein the first copolymer (a) is present in the polymer blend in an amount of less than or equal to 50 wt. %, with respect to total weight of the polymer blend, and the blend has a melt-flow index of about 10 gm/10 min.
   wherein the compressible tube is obtained by injection-molding the polymer blend.

2. The compressible tube according to claim 1, wherein the first copolymer is a linear low-density ethylene/butene copolymer.

3. The compressible tube according to claim 1, wherein the second copolymer is a linear low-density ethylene/octene copolymer.

4. The compressible tube according to claim 1, wherein the first polymer (a) has a density of less than or equal to 0.900 g/cm$^3$.

5. The compressible tube according to claim 1, wherein the first copolymer (a) has a melt flow index (ISO 1133 standard) of from 10 g/10 min. to 20 g/10 min.

6. The compressible tube according to claim 1, wherein the second copolymer (b) has a melt flow index (ISO 1133 standard) of from 4 g/10 min. to 8 g/10 min.

7. The compressible tube of claim 1, wherein the first copolymer (a) is present in an amount of less than or equal to 33 wt. % based on total weight of the polymer blend.

8. The compressible tube according to claim 1, wherein the wall has a thickness of from 0.2 mm to 1.0 mm.

9. The compressible tube according to claim 8, wherein the thickness of the wall is from 0.4 mm to 0.7 mm.

10. The compressible tube according to claim 1, wherein the wall has a length/diameter ratio of less than or equal to 4.

11. The compressible tube according to claim 1, wherein the package has a bottom obtained by pinching a free end of the wall, followed by heat sealing.

12. The compressible tube according to claim 1, wherein the package contains a cosmetic or dermatological product.

* * * * *